March 30, 1937.  A. HEWITT  2,075,646
METHOD OF MAKING A RECORD MOLD
Filed Jan. 28, 1933
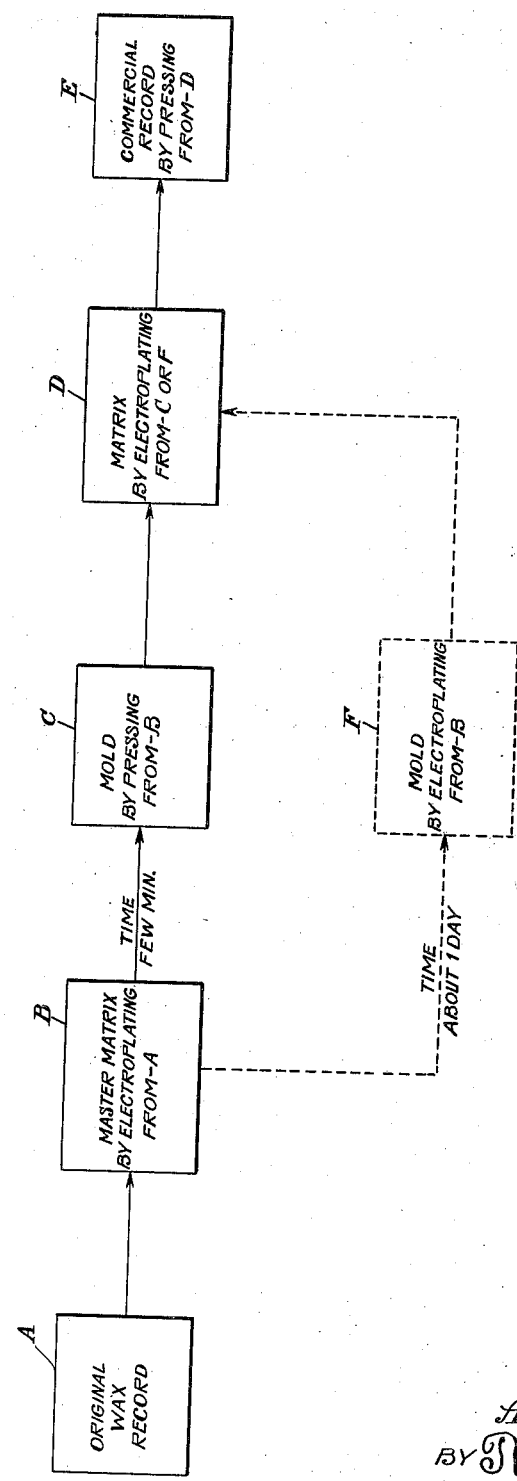
INVENTOR:
Albertis Hewitt,
BY J R Goldsborough
HIS ATTORNEY.

Patented Mar. 30, 1937

2,075,646

UNITED STATES PATENT OFFICE 2,075,646

METHOD OF MAKING A RECORD MOLD

Albertis Hewitt, Pitman, N. J., assignor to Radio Corporation of America, a corporation of Delaware Application January 28, 1933, Serial No. 653,952

1 Claim. (Cl. 18—5.3)

My invention relates to the phonograph record art, and more particularly to a method of forming matrices from which commercial disc records are pressed.

Heretofore, the method of producing record pressing matrices has comprised a number of steps, each of which is time consuming and relatively expensive. According to this method, the original recording is made in wax and the wax record is electroplated with a suitable metallic deposit which, after being removed from the wax and backed up by a copper or other metal backing, serves as the master matrix. To the face of the master is then applied a suitable separating medium over which another metallic layer is electrodeposited. The latter, being an exact copy of the original wax record but in more durable form, serves as a mold after it has been backed up by a suitable backing. A matrix is then made from the mold, also by electrodeposition of a metallic layer, and this matrix is employed in pressing the commercial records.

Since the process of electrodeposition is very slow, there is considerable time consumed between each of the various steps involved. For example, the step between the master matrix and the mold requires approximately a day or so. Hence, there is a definite time limitation upon the speed with which molds may be made from a single master matrix. Moreover, the process itself involves quite a considerable expense. It is, therefore, of great commercial significance to have available a method of making record molds in which the time factor is almost negligible, and especially where the cost may be reduced very considerably. To provide such a method is the primary object of my invention.

Another object of my invention is to provide an improved method of forming record molds from a single master matrix which permits the manufacture of a plurality of molds so rapidly that all the molds may be simultaneously treated to form a record pressing matrix from each without the loss of any appreciable time.

Still another object of my invention is to provide an improved record mold of such a nature that when its utility, as such, has ceased to exist, it may readily be reworked and a new mold readily made therefrom from a new master matrix.

A further object of my invention is to provide an improved method of forming record molds from a single master matrix which, although being inexpensive and readily lending itself to rapid quantity production of the molds, is, nevertheless, very efficient.

In accordance with my invention, I utilize the metallic master matrix as a pressing matrix or die and press this into suitable materials to form the mold. I have found that certain synthetic resins, such as the vinyl resins (for example, those having vinyl chloride or vinyl acetate as a base) are particularly well adapted for this purpose. These resins can be pressed in a record press under the action of heat and, since they are thermoplastic in nature, they can be reworked and used for pressing new molds after they have served their purpose in the form of a previous record mold. After the mold is pressed from the master matrix, it may be electroplated in the usual way to form the usual record pressing matrix from which commercial records are pressed.

Resins of the type mentioned are especially well adapted to undergo electrodeposition of a metal thereon because they may not only be made tough and durable, but they are very greatly resistant to the action of the electroplating bath. Hence they may be freely used for this purpose, whereas certain materials previously employed in the art, such as shellac, were unsuited for this purpose because they were easily attacked and destroyed by the electroplating bath, aside from lacking toughness and durability.

A further advantage derived from the method according to my invention is the great saving in time and cost over the method heretofore employed. Whereas, as previously stated, it takes about a day or so to electroplate the master to a sufficient degree to make a mold, it takes but a few minutes to press a resin mold from the metallic master. Therefore, a number of molds may be pressed in a few minutes and all of them placed in the electroplating bath and simultaneously electroplated, so that in substantially the same time that is required by the prior art method to make a single record pressing matrix, a plurality of matrices may be made by the method of my invention. As to the cost involved, the savings effected by my improved method may be as great as 90 per cent of the cost involved in the prior art method, and even more.

The novel features of my invention are set forth with particularity in the appended claim. The invention itself, however, is illustrated in the accompanying drawing in which the single figure shows, in solid lines, a schematic diagram of the steps of my improved method, while the dotted lines illustrate the electroplating step of the prior art which my improved method replaces.

Referring to the drawing, the block A represents the first step of the method wherein the sound is recorded on a wax blank in a manner well known to those skilled in the art. A master matrix designated by the block B is then prepared by electroplating the wax record A with a suitable metal, such as copper. Up to this point, the steps are the same in both the prior art method and in my improved method, but at this point, my improved method departs from that of the prior art.

According to the method heretofore employed, the master matrix B is first faced with a suitable separating film, and then placed in a suitable electroplating bath and coated with a metallic coating, such as copper, to form a metallic mold illustrated by the block F. This requires about a day. With my improved method, however, a vinyl resin or other suitable mold, designated by the block C, is pressed from the master B in but a few minutes. A number of resin molds C can be pressed in a very short time and all the molds can be electroplated simultaneously to form metallic matrices, such as illustrated by the block D, from which commercial records designated by the block E can be pressed in quantity. The surfaces of the resin molds C may be metallized in any suitable way, as by precipitating silver thereon from a solution of a silver salt, or by vaporizing or sputtering gold or other metal thereon in a vacuum, the metallized surface layer being suitably backed up by copper or other metal.

Although I have specifically referred to the use of vinyl resin in connection with the method of my invention, it should be clear that other resins, and, in fact, many materials other than resins may be found equally satisfactory. Thus, for example, resins of the phenol-aldehyde type or materials such as cellulose acetate may be used in place of the vinyl resins. In any event, my invention is not to be restricted except insofar as is necessitated by the prior art and by the spirit of the appended claim.

I claim as my invention:

In the method of forming a commercial sound record pressing matrix from a master matrix, the improvement which comprises molding a vinyl resin mold from said master matrix under heat and pressure, thereafter electroplating a metallic deposit on the mold so formed to produce the record pressing matrix, and subsequently separating said record pressing matrix from said mold.

ALBERTIS HEWITT.